United States Patent
Lim et al.

(10) Patent No.: US 10,756,397 B2
(45) Date of Patent: Aug. 25, 2020

(54) INTEGRATED BATTERY COOLING SYSTEM

(71) Applicants: Hyundai Motor Company, Seoul (KR); Kia Motors Corporation, Seoul (KR)

(72) Inventors: Hae Kyu Lim, Gyeonggi-do (KR); Yong Jae Kim, Gyeonggi-do (KR); Yong Hwan Choi, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/995,932

(22) Filed: Jun. 1, 2018

(65) Prior Publication Data

US 2019/0273291 A1     Sep. 5, 2019

(30) Foreign Application Priority Data

Mar. 2, 2018 (KR) .................. 10-2018-0025119

(51) Int. Cl.
*H01M 10/613* (2014.01)
*H01M 10/625* (2014.01)
(Continued)

(52) U.S. Cl.
CPC ....... *H01M 10/613* (2015.04); *H01M 2/1077* (2013.01); *H01M 2/1094* (2013.01); *H01M 10/625* (2015.04); *H01M 10/6551* (2015.04); *H01M 10/6554* (2015.04); *H01M 10/6555* (2015.04); *H01M 10/6556* (2015.04); *H01M 10/6568* (2015.04); *H01M 2220/20* (2013.01)

(58) Field of Classification Search
None
See application file for complete search history.

(56) References Cited

U.S. PATENT DOCUMENTS

| | | | | |
|---|---|---|---|---|
| 2011/0212356 A1* | 9/2011 | Tennessen | ............. | F28F 1/022 429/120 |
| 2017/0309980 A1* | 10/2017 | Hong | ...................... | H01M 2/10 |
| 2018/0175468 A1* | 6/2018 | Shin | ........................ | H01M 2/10 |

FOREIGN PATENT DOCUMENTS

| | | |
|---|---|---|
| CN | 205376685 U | 7/2016 |
| EP | 2955780 A1 | 12/2015 |

(Continued)

OTHER PUBLICATIONS

Xu et al. (CN 2053766685) a raw machine translation, Abstract, Jul. 6, 2016 (Year: 2016).*

(Continued)

*Primary Examiner* — Carmen V Lyles-Irving
(74) *Attorney, Agent, or Firm* — Mintz Levin Cohn Ferris Glovsky and Popeo, P.C.; Peter F. Corless

(57) ABSTRACT

An integrated battery cooling system is provided. The system includes a housing having a high-voltage battery and a secondary battery therein and having an inlet port and an outlet port formed on the outer side thereof to receive and discharge cooling water. A cooling channel is formed with cooling water flowing therethrough from the inlet port and the cooling channel transmits heat to the high-voltage battery. A cooling module receives the cooling water discharged from the cooling channel, transmits heat to the secondary battery, and then cools the secondary battery.

5 Claims, 4 Drawing Sheets

(51) Int. Cl.
      *H01M 10/6551*     (2014.01)
      *H01M 10/6556*     (2014.01)
      *H01M 2/10*         (2006.01)
      *H01M 10/6554*     (2014.01)
      *H01M 10/6555*     (2014.01)
      *H01M 10/6568*     (2014.01)

(56) References Cited

FOREIGN PATENT DOCUMENTS

KR    10-2011-0122303    11/2011
WO    2016/136194 A1    9/2016

OTHER PUBLICATIONS

Xu et al. (CN 2053766685) a raw machine translation, Detailed Description, Jul. 6, 2016 (Year: 2016).*
Xu et al. (CN 2053766685) a raw machine translation, Drawings, Jul. 6, 2016 (Year: 2016).*
Extended European Search Report for European Patent Application No. 18183455.7, dated Dec. 19, 2018, 7 pages.

* cited by examiner

INTEGRATED BATTERY COOLING SYSTEM

CROSS REFERENCE TO RELATED APPLICATION

The present application claims priority to Korean Patent Application No. 10-2018-0025119, filed Mar. 2, 2018, the entire contents of which is incorporated herein for all purposes by this reference.

BACKGROUND

1. Field of the Disclosure

The present disclosure relates to an integrated battery cooling system that effectively cools a battery structure formed by integrating a high-voltage battery and a 12 Volts-assistant battery to be applied to a hybrid vehicle.

2. Description of the Prior Art

In general, hybrid electric vehicle/plug-in hybrid electric vehicles (HEV/PHEV) which are representative of eco-friendly vehicles are generally equipped with a gasoline or diesel engine and a motor that generates power using power from the engine and assists power from the engine when the motor is operated by power stored in a battery etc. A motor is also used as power source in eco-friendly vehicles in the related art, and thus, a high-voltage battery having large capacity and an assistant battery charged with low voltage converted from the voltage of the high-voltage battery are typically used. The assistant battery or secondary battery is used to start an engine and supply power to various electronic devices in a vehicle.

The high-voltage battery and an assistant battery are separated in the related art, but a structure having a high-voltage battery and an assistant battery disposed in a single housing has been recently proposed. However, the high-voltage battery and assistant battery are cooled by air or water to remove heat generated by battery cells. Accordingly, the commercial value of a battery for a vehicle needs to be improved by maximally securing cooling efficiency with a minimum package volume when applying a cooling structure to a package of a high-voltage battery and an assistant battery.

The description provided above as a related art of the present disclosure is merely for helping understanding the background of the present disclosure and should not be construed as being included in the related art known by those skilled in the art.

SUMMARY

The present disclosure provides an integrated battery cooling system that effectively reduces the manufacturing cost and package volume and efficiently cools a battery by having a cooling module that indirectly and secondarily cools a secondary battery using cooling water from a cooling channel for cooling a high-voltage battery with water.

In accordance with an aspect of the present disclosure, an integrated battery cooling system may include: a housing in which a high-voltage battery and a secondary battery are accommodated and having an inlet port and an outlet port on the outer side to receive and discharge cooling water; a cooling channel formed such that cooling water flows through the inside from the inlet port, and that transmits heat to the high-voltage battery; and a cooling module configured to receive cooling water discharged from the cooling channel, transmit heat to the secondary battery, and cool the secondary battery.

In particular, the cooling module may include: a cooling block that forms a chamber, disposed in front of the secondary battery, and having an inlet configured to receive cooling water from the cooling channel and an outlet configured to discharge the cooling water therein to the outlet port; and a cooling plate that extends from the cooling block to transmit heat to a side of the secondary battery. A plurality of high-voltage batteries provided and disposed at both sides with a predetermined gap therebetween within the housing, and the secondary battery may be disposed between the high-voltage batteries.

The cooling block may include an inlet on each of both sides thereof and an outlet on one side thereof. The inlet port and the outlet port may be formed on a front of the housing. A first passage may connect the inlet port and the inlet of the cooling channel to each other, a second passage may connect the outlet of the cooling channel and the inlet to each other, and a third passage may connect the outlet and the outlet port to each other. The cooling module may further include a cooling fin formed in a plate shape with an end between the cooling plate and a side of the secondary battery, made of a thermal conductive material, and extending perpendicularly through the secondary battery from the end.

The secondary battery may include: a battery cell; battery housings that cover the top and bottom of the battery cell; and battery covers fixed to the battery housings, that cover both sides of the battery cell, include an insertion groove where an end of the cooling fin is seated on the outer side, and having an aperture at the middle portion through which the cooling fin may be inserted. The battery covers may be made of a thermal interface material. A plurality of cooling fins may be provided and alternately stacked with the battery cell in the front-rear direction of the secondary battery.

According to the integrated battery cooling system having the structure described above, it may be possible to minimize an increase in an overall package volume and weight of the structure having a high-voltage battery and a secondary battery in an integrated module and effectively cool the high-voltage battery and the secondary battery. Further, the package structure of a high-voltage battery, a secondary battery, and a cooling module is optimally designed, to thus simplify heat transmission path and improve the cooling performance, thereby being able to prevent an increase of differential pressure. Since a high-voltage battery is primarily cooled and then a secondary battery is secondarily cooled by cooling water, it may be possible to prevent deterioration of the cooling performance for the high-voltage battery.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An integrated battery cooling system according to an exemplary embodiment of the present disclosure is described hereafter with reference to the accompanying drawings.

Figure 1:
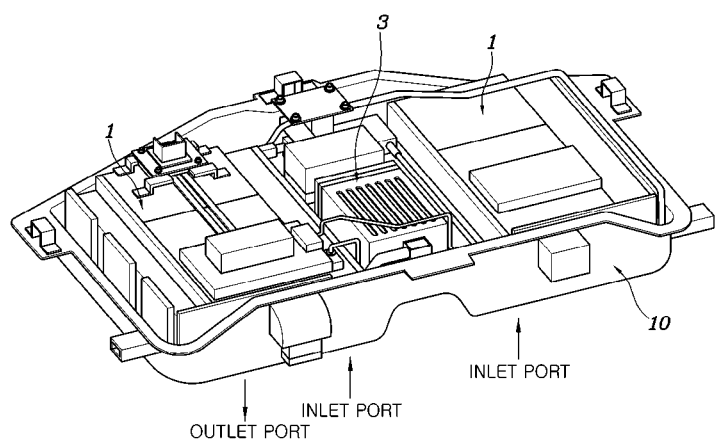
FIG. 1 is a perspective view showing an integrated battery cooling system according to an exemplary embodiment of the present disclosure.
Figure 2:
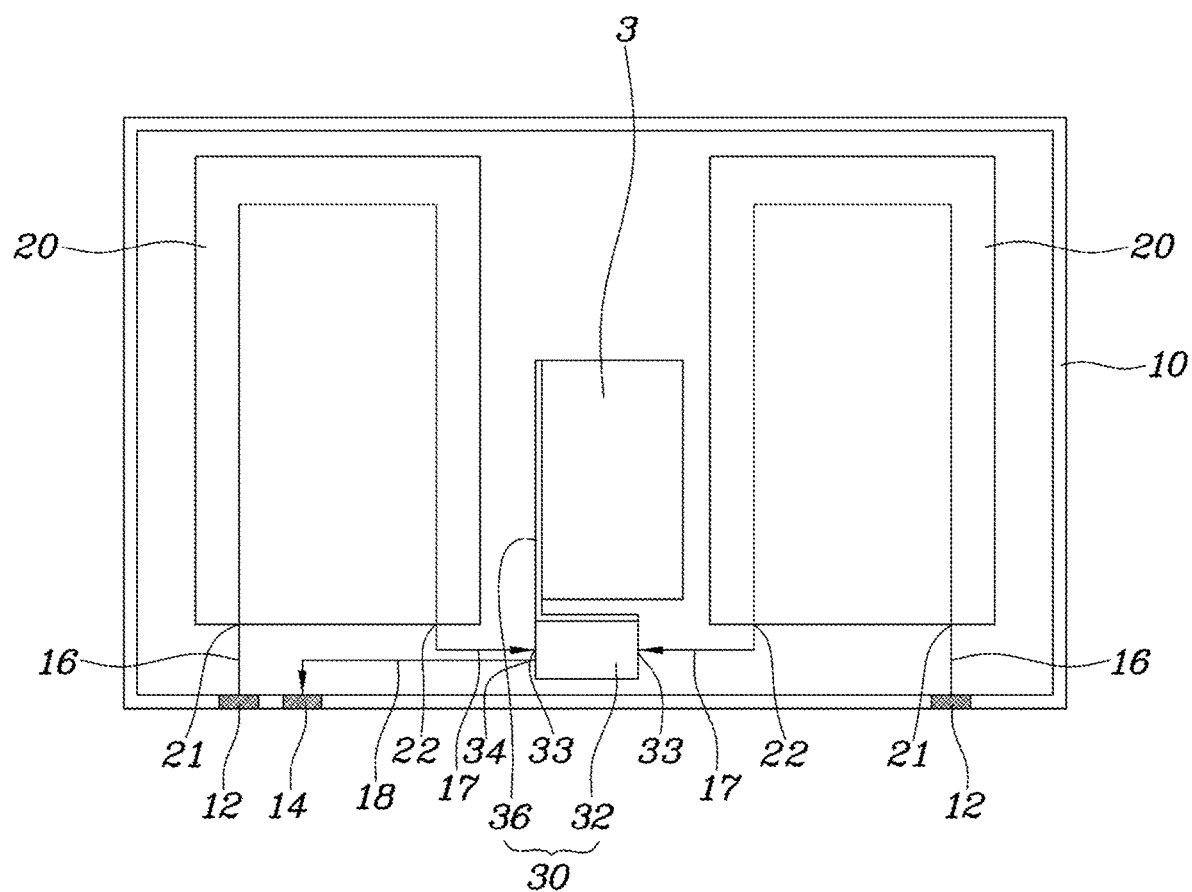
FIG. 2 is a view showing the lower portion of the integrated battery cooling system according to an exemplary embodiment of the present disclosure.

FIG. 1 is a perspective view showing an integrated battery cooling system according to an exemplary embodiment of the present disclosure and FIG. 2 is a view showing the lower portion of the integrated battery cooling system according to an exemplary embodiment of the present disclosure.

Referring to FIGS. 1 and 2, an integrated battery cooling system of the present disclosure may include: a housing 10 having a high-voltage battery 1 and a secondary battery 3 (e.g., an auxiliary battery) therein and having an inlet port 12 and an outlet port 14 on an outer side thereof to receive and discharge cooling water; a cooling channel 20 through which cooling water flows through from the inlet port 12 and that transmits heat to the high-voltage battery 1; and a cooling module 30 configured to receive cooling water discharged from the cooling channel 20, transmit heat to the secondary battery 3, and cool the secondary battery 3.

Since an engine and a motor are mounted as a power source in hybrid electric vehicle/plug-in hybrid electric vehicles (HEV/PHEV), high voltage is required to operate a driving motor or a hybrid starter generator (HSG) and the high-voltage battery 1 provides the high voltage. However, along with the driving motor and the HSG, electronic devices that are operated at low voltage are mounted within a vehicle and the electronic devices malfunction when excessively high voltage is supplied thereto, and thus, the high voltage from the high-voltage battery 1 is required to be converted into low voltage.

Further, the secondary battery 3 may be configured to store low-voltage current converted from the high voltage from the high-voltage battery 1 by a Low voltage direct current-direct current (DC-DC) Converter (LDC) (not shown) and transmit the current to the electronic devices within a vehicle. In general, the secondary battery 3 may be a lithium battery of 12V, but the disclosure is not limited thereto. Additionally, in the related art, the high-voltage battery and a secondary battery are typically disposed in different packages or housings within vehicles. However, the present disclosure proposes a structure in which the high-voltage battery 1 and the secondary battery 3 are formed in a module in a single housing 10 and are both cooled therein.

Moreover, the inlet port 12 configured to receive cooling water and the outlet port 14 configured to discharge cooling water may be formed on an outer side of the housing 10 to cool the high-voltage battery 1 and the secondary battery 3 using the cooling water. The inlet port 12 may be configured to receive the cooling water from a water pump within a vehicle. The cooling channel 20 may be formed in a plate shape that covers the bottom of the high-voltage battery 1 and allows cooling water from the inlet port 12 of the housing 10 to circulate through passages therein, thereby cooling the high-voltage battery 1. The cooling channel 20 may be made of a material having high thermal conductivity to maximize cooling efficiency.

The secondary battery 3 may be indirectly cooled by the cooling module 30, that is, the cooling module 30 may be configured to cool the secondary battery 3, using cooling water received from the cooling channel 20. The secondary battery 3 generates low voltage, compared to the high-voltage battery 1, and thus, generates less heat than the high-voltage battery 1. According to the present disclosure, the cooling water first cools the high-voltage battery 1 and then cools the secondary battery 3, thereby preventing reduction of cooling efficiency for the high-voltage battery 1. Further, the cooling water used to cool the high-voltage battery 1 may be reused to cool the secondary battery 3, thus eliminating a structure that is connected to the water pump to cool the secondary battery 3 and decreasing an overall package volume and manufacturing cost.

Figure 3:
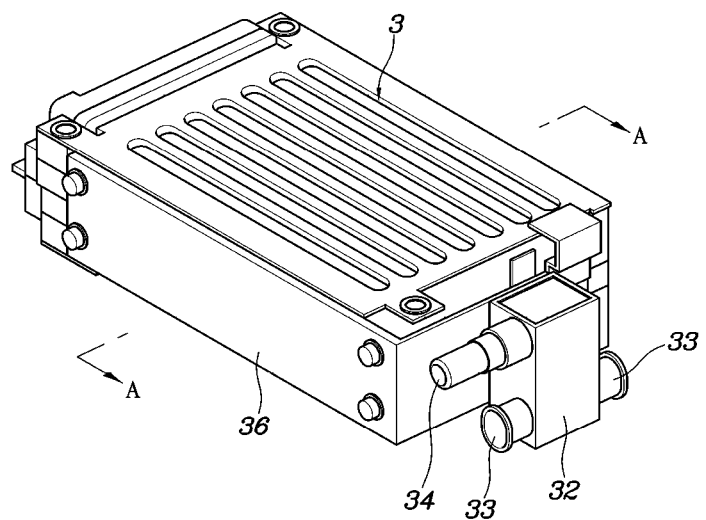
FIG. 3 is a perspective view showing an assembly of a secondary battery and a cooling module according to an exemplary embodiment of the present disclosure.

FIG. 3 is a perspective view showing an assembly of a secondary battery and a cooling module according to an exemplary embodiment of the present disclosure. Referring to FIGS. 2 and 3, the cooling module 30 may be configured to exchange heat with the secondary battery 3 by receiving cooling water from the cooling channel 20. In particular, the cooling module 30 may include: a cooling block 32 that forms a chamber, disposed in front of the secondary battery 3 (e.g., formed between the housing and the secondary battery), and having an inlet 33 configured to receive cooling water from the cooling channel 20 and an outlet 34 configured to discharge the cooling water therein to the outlet port 14; and a cooling plate 36 that extends from the cooling block 32 to transmit heat to a side of the secondary battery 3.

The cooling module 30 may include the cooling block 32 that is a chamber into/out of which cooling water may flow and the cooling plate 36 that extends from the cooling block 32 to transmit heat to a side of the secondary battery 3. In general, the secondary battery 3 is greater in surface area on the top and bottom than both sides thereof and a side of the secondary battery 3 may be cooled by the cooling plate 36 at a low temperature, and thus, the package volume or weight is less increased than a cooling channel type. Since the aforementioned low temperature means a temperature of the cooling water after cooling the high voltage batteries (w/chiller operation), it may vary depending on the load of the current of the high voltage batteries or the temperature around the vehicle. As an example, the low temperature may generally be 10 to 25° C. in normal conditions.

In a cooling channel type, the cooling channel includes a passage for circulation of cooling water and has a predetermined thickness to cool the secondary battery 3. However, in the present disclosure, since cooling water does not circulate in the cooling plate 36, the thickness may be minimized, and thus the volume, weight, and cost may be reduced in comparison to a cooling structure of the cooling channel type. According to the present disclosure, instead of circulating cooling water in the cooling plate 36, the cooling block 32 that is a separate chamber for circulating cooling water may be provided to exchange heat with the cooling plate 36, and thus, the cooling plate 36 may be maintained at a low temperature by cooling water. Therefore, according to the cooling module 30, although the secondary battery 3 is cooled by water, an increase of the volume package, weight, and cost may be minimized, thus improving the commercial value of a vehicle.

As shown in FIG. 3, the cooling plate 36 may be disposed with a first side positioned at the rear end of the cooling block 32 and a second side thereof may transmit heat to a side of the secondary battery 3, but the contact portion between the cooling plate 36 and the cooling block 32 may be changed as desired. Referring to FIGS. 1 and 2, a plurality of high voltage batteries 1 may be provided and positioned at both sides in the housing 1 with a predetermined gap formed therebetween and the secondary battery 3 may be disposed between the high-voltage batteries 1.

Further, the cooling block 32 may include an inlet 33 on each of both sides thereof and an outlet 34 on one side thereof. The inlet port 12 and the outlet port 14 may be formed at the front of the housing 10, and a first passage 16 may connect the inlet port 12 and the inlet of the cooling channel 20 to each other, a second passage 17 may connect the outlet of the cooling channel 20 and the inlet 33 to each other, and a third passage 18 may connect the outlet 34 and the outlet port 14 to each other. In other words, in the housing 10, the high-voltage batteries 1 may be disposed at both sides of the secondary battery 3, the cooling block 32 may be disposed in front of the secondary battery 3, and the cooling plate 36 that extends from the cooling block 32 may be disposed on a side of the secondary battery 3.

Additionally, cooling water may cool the high-voltage batteries 1 and the secondary battery 3 by flowing through the inlet port 12 of the housing 10, the first passage 16, the cooling channel 20, the second passage 17, the inlet 33 and outlet 34 of the cooling block 32, the third channel 18, and the outlet port 14. Assuming that the inlet port 12 and the outlet port 14 are formed at the front of the housing 10 and the inlet and the outlet for receiving and discharging cooling water are formed on the front of the cooling channel 20, the length of the first, second, and third passages 16, 17, and 18 may be minimized, and thus, the weight and volume package of the integrated battery cooling system may be minimized.

Figure 4:
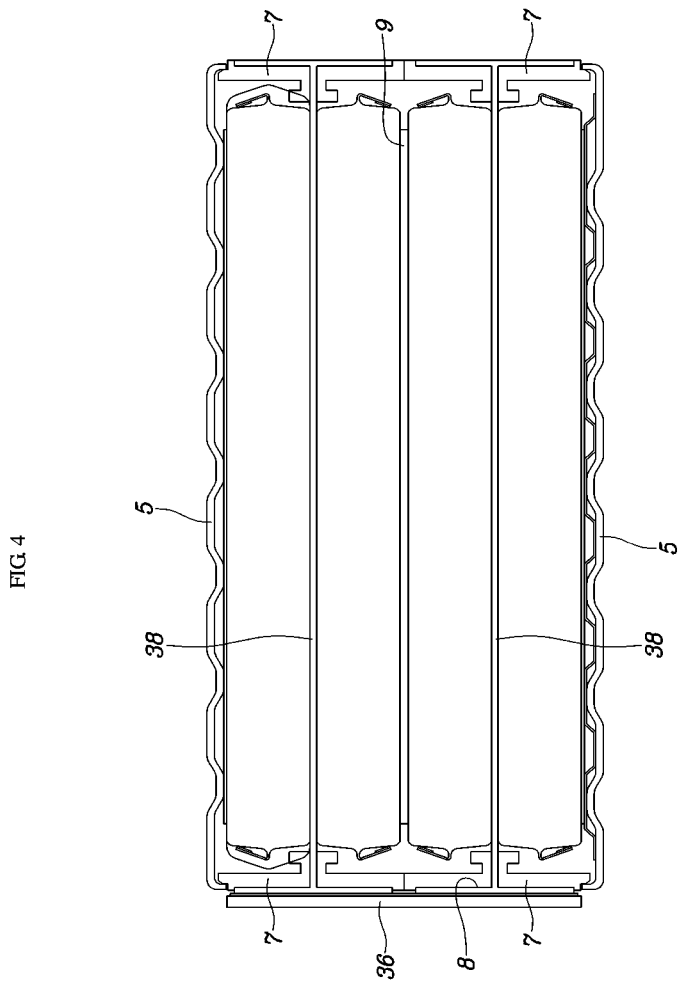
FIG. 4 is a cross-sectional view taken along line A-A shown in FIG. 3 according to an exemplary embodiment of the present disclosure.

FIG. 4 is a cross-sectional view taken along line A-A shown in FIG. 3. Referring to FIG. 4, the cooling module 30 may further include a cooling fin 38 formed in a plate shape with one end disposed between the cooling plate 36 and a side of the secondary battery 3, made of a thermal conductive material, and extending perpendicularly through the secondary battery from the end. In other words, the cooling fin 38 may be configured to transmit heat to the cooling plate 36 and may be disposed through the secondary battery 3, to improve the performance of cooling the secondary battery 3 through the cooling module 30.

The secondary battery 3 may include a battery cell 9, battery housings 5 that cover the top and bottom of the battery cell 9, and battery covers 7 fixed to the battery housings 5, that cover both sides of the battery cell 9, having an insertion groove 8 where a first end or a second end of the cooling fin 38 is seated on the outer side, and having an aperture at the middle portion through which the cooling fin 38 may be inserted. In other words, the battery covers 7 that cover both sides of the battery cell 9 may be disposed on the secondary battery 3 to fix the cooling fins 38 disposed laterally through the secondary battery 3.

In particular, the insertion grooves 8 may be formed on the outers of the battery covers 7 to seat one end of the plate-shaped cooling fin 38, and to fix the cooling fin 38 to the secondary battery 3. In addition, the cooling fin 38 may be formed in an I-shape. The battery covers 7 may be made of a thermal interface material. Accordingly, the battery cover 7 may be cooled by exchanging heat with the cooling plate 36, and thus, the sides of the secondary battery 3 may be cooled and the cooling performance for the battery cell 9 may be improved. Further, a plurality of cooling fins 38 may be provided and alternately stacked with the battery cell 9 in the front-rear direction of the secondary battery 3. Accordingly, the stacked battery cells 9 may be cooled more smoothly by the cooling fins 38.

According to the integrated battery cooling system having the structure described above, it may be possible to minimize an increase in package volume and weight of the structure having a high-voltage battery and a secondary battery in an integrated module and effectively cool the high-voltage battery and the secondary battery. Further, the package structure of a high-voltage battery, a secondary battery, and a cooling module may be optimally designed, to simplify the heat transmission path and improve the cooling performance, thereby being able to prevent an increase of differential pressure. Since a high-voltage battery is primarily cooled and then a secondary battery is secondarily cooled by cooling water, it may be possible to prevent deterioration of the cooling performance for the high-voltage battery.

Although the present disclosure was provided above in relation to specific exemplary embodiments shown in the drawings, it is apparent to those skilled in the art that the present disclosure may be changed and modified in various ways without departing from the scope of the present disclosure, which is described in the following claims.

What is claimed is:

1. An integrated battery cooling system, comprising:
a housing having an inlet port and an outlet port disposed on an outer side thereof to receive and discharge cooling water;
a plurality of high-voltage batteries respectively disposed at both sides in the housing with a gap formed therebetween;
a secondary battery disposed between the plurality of high-voltage batteries;
a plurality of cooling channels through which cooling water flows through from the inlet port, and each configured to transmit heat to each of the plurality of high-voltage batteries;
a cooling module configured to receive cooling water discharged from each of the plurality of cooling channels, transmit heat to the secondary battery, and cool the secondary battery, and discharge the cooling water therein to the outlet port,
wherein the cooling module includes:
a cooling block that forms a chamber, disposed in front of the secondary battery, and having a plurality of inlets each configured to receive cooling water from each of the plurality of cooling channels and an outlet configured to discharge the cooling water therein to the outlet port; and a cooling plate that extends from the cooling block to transmit heat to a side of the secondary battery, wherein each of the plurality of inlets is disposed on each of both sides of the cooling block and the outlet is disposed on one side of the cooling block, wherein the inlet port and the outlet port are formed at a front of the housing, wherein each of the cooling channels has a first passage, a second passage, and a third passage, and wherein the first passage connects the inlet port and an inlet of the cooling channel to each other, the second passage connects an outlet of the cooling channel and an inlet of the cooling block to each other, and the third passage connects the outlet of the cooling block and the outlet port to each other, such that the cooling water cools the plurality of high-voltage batteries first, and then cools the secondary battery.

2. The integrated battery cooling system of claim 1, wherein the cooling module further includes a cooling fin formed in a plate shape with an end between the cooling plate and a side of the secondary battery, made of a thermal conductive material, and extending perpendicularly through the secondary battery from the end.

3. The integrated battery cooling system of claim 2, wherein the secondary battery includes:

a battery cell;

battery housings that cover the top and bottom of the battery cell; and at least one battery cover fixed to the battery housings to cover both sides of the battery cell, having an insertion groove where one end of the cooling fin is seated, and having an aperture at a middle portion of the battery cover, wherein the cooling fin is inserted through the aperture.

4. The integrated battery cooling system of claim 3, wherein the battery covers are made of a thermal interface material.

5. The integrated battery cooling system of claim 3, wherein a plurality of cooling fins are alternately stacked with the battery cell in a front-rear direction of the secondary battery.

* * * * *